Aug. 20, 1940.   U. D. IRWIN ET AL   2,212,207
ROASTING RACK
Filed March 27, 1939
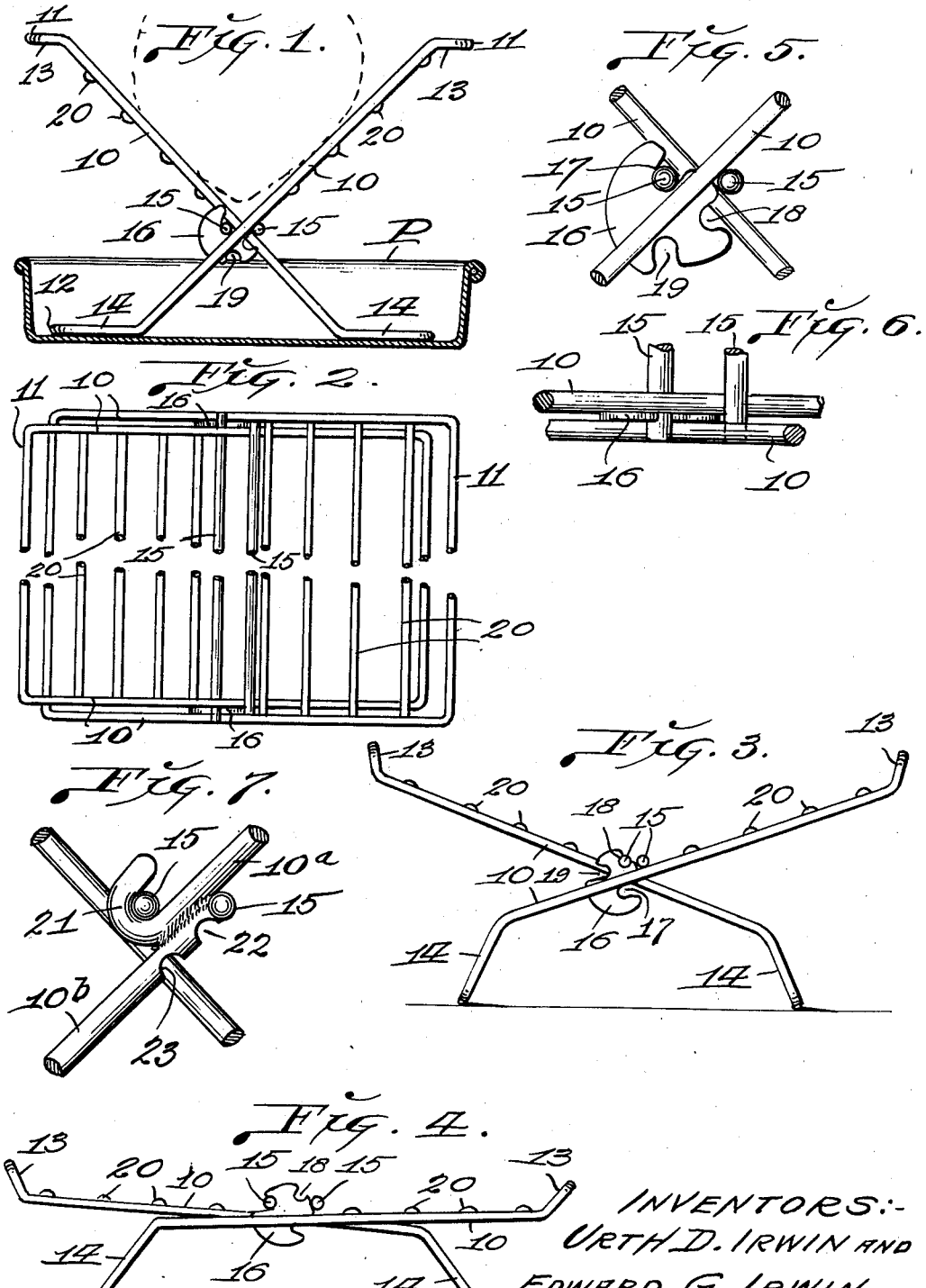

Patented Aug. 20, 1940

2,212,207

UNITED STATES PATENT OFFICE 2,212,207

ROASTING RACK

Urth D. Irwin and Edward G. Irwin, Los Angeles, Calif.

Application March 27, 1939, Serial No. 264,298

9 Claims. (Cl. 53—5)

Our invention relates to a roasting rack of the general type disclosed in application for U. S. Letters Patent filed by us January 3, 1939, Serial No. 248,923, also the roasting rack filed by Urth D. Irwin October 15, 1938, Serial No. 235,198.

The principal objects of our present invention are, to generally improve upon and simplify the construction of the roasting racks forming the subject matter of the above mentioned co-pending patent applications, as well as other existing forms of roasting racks, further, to provide a convertible and adjustable roasting rack that is formed in two parts and further, to construct the parts of the rack so that they may be easily and conveniently manipulated when assembled and adjusted for use.

A further object of our invention is, to provide a two-part convertible roasting rack of the character referred to that may be readily adjusted so as to be used for effectively roasting large fowls, such as turkeys and geese, for small fowls, such as chicken and duck, also for cooking by roasting or baking comparatively large pieces of meat, for instance, hams and large roasts of beef or pork and further, for the cooking or broiling of steaks, large chops, slices of ham, and the like.

Further objects of our invention are, to provide a convertible and adjustable roasting rack which under all adjustments supports the meat or fowl that is being cooked, broiled or roasted, a substantial distance above the bottom of the oven or the dripping pan in which the rack is positioned, thus enabling heated air to circulate freely beneath and around all sides of the meat or fowl, further, to provide a roasting rack that may be easily assembled or taken apart, readily cleaned, capable of being packed into a comparatively small space while not in use or while being shipped or stored and further, to provide a convertible roasting rack that is simple in construction and consequently inexpensive of manufacture.

With the foregoing and other objects in view, our invention consists in certain novel features of construction and arrangement of parts that will be hereinafter more fully described and claimed and illustrated in the accompanying drawing in which:

Fig. 1 is an end elevational view of a rack of our improved construction and showing the same adjusted for use in cooking fowl.

Fig. 2 is a plan view of the rack seen in Fig. 1 with parts broken away.

Fig. 3 is an end elevational view of the rack adjusted for use in cooking or roasting large pieces of meat, such as hams or large roasts of beef, pork, or the like.

Fig. 4 is an end elevational view of the rack adjusted into position for broiling steaks, chops, slices of ham and the like.

Fig. 5 is an enlarged detail end view showing the hinge or pivotal connection between the ends of the frames that form the roasting rack.

Fig. 6 is a plan view of the parts seen in Fig. 5.

Fig. 7 is an end elevational view similar to Fig. 5 and showing a modified form of the hinge or pivotal connection between the crossed end members of the rack.

As illustrated, our rack comprises two practically identical skeleton frames formed of heavy wire or light weight metal rods and the wire forming each frame is bent to form a pair of end members 10, a straight member 11 that connects the upper ends of the end members 10 and a straight member 12 that connects the lower ends of said end members.

The length of one of the frames is slightly less than the length of the other so that when the two frames are assembled to produce the rack, the end members 10 of one frame lie inside and immediately adjacent the end members of the other frame.

Short portions 13 at the upper ends of the end members 10 are bent into angular positions approximately one hundred thirty-five degrees from the plane occupied by the end members and, in a similar manner portions 14 at the lower ends of the end members 10 are bent into angular positions approximately one hundred thirty-five degrees from the planes occupied by the end members 10 and thus, the rack when adjusted into position for roasting fowl and the like as illustrated in Figs. 1 and 2, the crossed end members 10 occupy positions at right angles to each other and with the bent lower end portions 14 of the end members 10 and the bent portions 13 at the upper ends of said end members occupying horizontal planes.

The bent lower end portions 14 of the end members and the lower members 12 that connect said portions 14 constitute feet or base members that are adapted to rest on the bottom of an oven in which the rack is used or on the bottom of a conventional dripping pan P which serves as a receptacle for the juices that drop from the fowl or meat that is being roasted.

Suitably secured by spot welding or otherwise to the under sides of the end members 10 and preferably below the longitudinal centers of said members are straight wires or rods 15 that connect the end members 10 of the respective frames and, the ends of these wires or rods which are of equal length terminate in the vertical planes occupied by the outer surfaces of those end members 10 that lie outside the other pair of end members.

As a result of this arrangement, the end portions of the wire or rod 15 that are connected to the end members 10 of the frame that is positioned between the end members of the other frame, overlie the end members 10 of the longer frame (see Fig. 6).

Secured by welding or otherwise to the inner faces of the end members 10 of the frame that lie outside the end members of the other frame immediately adjacent and below the ends of the rod 15 that is connected to the end members of the longer frame are metal plates 16 and, formed in the upper portion of each plate on opposite sides of the end member 10 to which the plate is connected, are notches 17 and 18 that are adapted to receive the ends of the wire or rod 15 that are connected to the end members 10 of the shorter frame.

Formed in the lower portion of each plate 16 adjacent the end member to which it is connected and on the opposite side of said end member from the notch 17, is a notch 19 adapted to receive the ends of the rod 15 that is connected to the shorter one of the frames when the rack is utilized for roasting fowl (see Figs. 1 and 5).

In order to provide a grid or rack to support the fowl or meat while the same is being cooked or roasted, narrow strips 20 of metal or half round wire, or metal rods, have their ends permanently secured by welding or otherwise to those portions of the end members 10 between the members 15 and the members 11 that connect the upper ends of said end members 10.

These strips or wires 20 are preferably secured to the under sides of the end members 11 and said strips or wires lie substantially parallel with each other and with the members 11 and 15. Thus the members 20 provide an effective open grid for supporting the fowl or meat that is being cooked by roasting or broiling.

When our improved rack is utilized for roasting a fowl, the shorter one of the rack forming members is positioned between the end members 10 of the longer rack forming member and the ends of the rod 15 that is secured to the shorter rack are positioned in the notches 17 in plates 16. When the two parts of the rack are thus assembled, the rack takes the form as illustrated in Fig. 1 with the crossed end members 10 disposed substantially at right angles to each other and with the portions 14 on the lower ends of said end members occupying a substantially horizontal plane, so that the rack may rest firmly on the bottom of the oven or a dripping pan that is positioned on the oven bottom and, the space between the upper portions of the two rack forming members being substantially V-shape in cross section so as to conveniently receive the fowl that is to be roasted.

In roasting large fowl, such as turkeys and geese, best results are attained from placing the fowls in the rack, breast downward in order that the juices may gravitate into the breasts of the fowl and thereby counteract the dryness of the breast portions of fowl when the same are roasted with their breasts uppermost.

Where the rack is utilized for roasting whole hams or large roasts of beef, or the like, the parts thereof are assembled so that the rack takes the form as illustrated in Fig. 3.

The two parts of the rack are turned into position so that the end portions 13 of both parts of the rack occupy substantially vertical positions and the portions 14 at the lower ends of the end members 10 project downwardly and outwardly. The shorter rack member is inserted between the end members of the longer rack member and the ends of the rod 15 that is secured to the end members 10 of the short rack member are engaged in the notches 18. As a result of this arrangement, the upper grid portions of the rack gradually decline from the sides of the rack toward the intermediate point where the end members 10 cross each other, thus providing a firm and substantial support for a ham or a large piece of meat that is to be roasted.

Where the rack is adjusted for use in broiling steaks, chops, slices of ham, or the like, the projecting ends of the rod 15 that is secured to the end members 10 of the shorter rack are engaged in the notches 19 and, as a result of such engagement, the grid portions of both rack forming members occupy a substantially horizontal plane as illustrated in Fig. 4.

An especially desirable feature of our invention is, the construction whereby the rack in all of its different positions of use, supports the fowl or meat that is being cooked by roasting or broiling, a substantial distance above the bottom of the oven or the pan in which the rack is positioned, thus enabling the heated air within the oven to circulate freely beneath, above and to the sides of the fowl or meat and further, such construction enables vegetables and food products, such as dressing, Yorkshire pudding, and the like, to be placed in the pan in which the rack is positioned so that drippings from the fowl or meat that is being roasted will drop directly onto said vegetables, dressing, or the like.

Where the rack is utilized for broiling meat, an inverted dripping pan or other suitable support may be placed on the bottom of the oven and thus, the grid portion of the rack which receives the meat is located immediately adjacent the burners or heating coils in the oven.

In Fig. 7 we have shown a modified construction wherein the notched plates 16 are eliminated. In this construction, the longer one of the frames is formed from two parts of wire or light weight metal rod with the joints between said two parts located between the rack end forming members 10a and 10b. As illustrated in Fig. 7, the end portions of these end forming members overlap each other a short distance and such overlapping portions are permanently connected by welding or otherwise.

The end of portion 10a is bent upwardly to form a hook 21 that receives the projecting end of the cross rod 15 that is secured to the shorter one of the rack forming members and, formed in the under side of the end portions of the end forming members 10b are notches 22 and 23.

When this form of rack is adjusted for use in roasting fowl, the projecting ends of the rod 15 that is secured to the shorter rack forming member occupy the hooks 21 and, when the rack forming parts are adjusted to enable the rack to be used for supporting large roasts and hams, the projecting ends of the rod 15 engage in notches 22.

When the rack is adjusted for broiling purposes, the projecting ends of rod 15 on the shorter rack forming member occupy the notches 23.

Inasmuch as our improved rack comprises only two parts, said rack may be easily and inexpensively produced and, as the two parts of the rack are identical in shape and comparatively flat they may be assembled so as to occupy comparatively little space when packed for storage or transportation.

Inasmuch as the parts of the rack are devoid of narrow pockets or recesses, there are no places for grease or the like to collect and this provision enables the rack to be easily and quickly cleaned and maintained in a sanitary condition.

Thus it will be seen that we have provided a roasting rack that is relatively simple in construction, inexpensive of manufacture and very effective in performing the functions for which it is intended.

It will be understood that minor changes in the size, form and construction of the various parts of our improved roasting rack, may be made and substituted for those herein shown and described, without departing from the spirit of our invention, the scope of which is set forth in the appended claims.

We claim as our invention:

1. A roasting rack comprising two substantially identical skeleton frames, each including a pair of end members arranged with the end members of one frame crossing the end members of the other frame and cooperating adjustable pivotal means mounted on the intermediate portions of said end members for holding said frames in differently adjusted positions.

2. A roasting rack as set forth in claim 1, with grids on the upper portions of said frames.

3. A roasting rack comprising two substantially identical skeleton frames, each having a pair of end members, one frame being shorter than the other in order that it may be inserted between the end members of the other frame and co-operating means on the intermediate portions of the end members of the two frames for holding the same in differently adjusted positions.

4. A roasting rack as set forth in claim 3 and with grids on those portions of the frames above said co-operating frame holding means.

5. A roasting rack comprising two substantially identical skeleton frames, one frame being shorter than the other so that it may be inserted in the other frame and co-operating means on the ends of said frames for maintaining the same in crossed angular relation.

6. A roasting rack as set forth in claim 5, with grids on the upper portions of said frames.

7. A roasting rack comprising a pair of substantially identical skeleton frames, each having a pair of end members, a rod connecting the intermediate portions of the end members of each frame, the ends of the rod on one frame extending slightly beyond the end members to which it is connected and plates carried by the end members of the other frame, which plates are provided with notches for the reception of the projecting ends of said rod.

8. A roasting rack as set forth in claim 7, with grids on the upper portions of the end members of said frames.

9. A roasting rack comprising a pair of substantially identical skeleton frames, each having a pair of end members, a rod connecting the intermediate portions of the end member of each frame, the ends of the rod on one frame extending slightly beyond the end members to which it is connected and plates secured to the end members of the other frame, each of which plates is provided with a plurality of notches arranged so as to receive the projecting ends of the rod and support the two frames in differently adjusted angular positions.

URTH D. IRWIN.
EDWARD G. IRWIN.